United States Patent
Bharucha et al.

(10) Patent No.: US 6,324,174 B2
(45) Date of Patent: *Nov. 27, 2001

(54) TELECOMMUNICATIONS NETWORK ARCHITECTURE FOR TRANSPORTING FAX, VOICE AND DATA VIA AN ATM SWITCH INCLUDING A STM TO ATM TERMINAL ADAPTER

(75) Inventors: Behram H. Bharucha, Millburn; Thomas S. Giuffrida, Middletown; Norman Farber, Freehold; Arik Kashper, Holmdel; Steven S. Katz, Ocean, all of NJ (US)

(73) Assignee: AT&T Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/001,577

(22) Filed: Dec. 31, 1997

(51) Int. Cl.[7] .............................. H04L 12/66; H04L 12/56
(52) U.S. Cl. ........................ 370/352; 370/395; 370/230
(58) Field of Search .................................. 370/230, 307, 370/352, 353, 395, 401, 466, 467

(56) References Cited

U.S. PATENT DOCUMENTS

| | | |
|---|---|---|
| 5,130,985 | 7/1992 | Kondo et al. . |
| 5,315,591 | 5/1994 | Brent et al. . |
| 5,373,504 | 12/1994 | Tanaka et al. . |
| 5,390,184 * | 2/1995 | Morris .............................. 370/353 |
| 5,457,700 * | 10/1995 | Merchant et al. ................ 714/744 |
| 5,483,527 | 1/1996 | Doshi et al. . |
| 5,568,475 | 10/1996 | Doshi et al. . |
| 5,570,355 * | 10/1996 | Dail et al. ........................ 370/352 |
| 5,703,876 * | 12/1997 | Christie ............................ 370/395 |
| 5,742,600 * | 4/1998 | Nishihara ......................... 370/395 |
| 5,764,637 * | 6/1998 | Nishihara ......................... 370/395 |
| 5,790,552 * | 8/1998 | Proctor et al. ................... 370/466 |
| 5,825,780 * | 10/1998 | Christie ............................ 370/522 |
| 5,920,559 | 7/1999 | Awaji . |
| 5,920,562 * | 7/1999 | Christie et al. .................. 370/395 |
| 5,926,477 * | 7/1999 | Shirokura et al. ............... 370/395 |
| 5,930,253 * | 7/1999 | Brueckheimer et al. ........ 370/395 |
| 5,940,407 | 8/1999 | Tamura . |
| 6,061,504 | 6/2000 | Tanaka et al. . |
| 6,075,798 * | 6/2000 | Lyons et al. ..................... 370/474 |

FOREIGN PATENT DOCUMENTS

408111683 A * 4/1996 (JP) .............................. H04L/12/28

* cited by examiner

Primary Examiner—Hassan Kizou
Assistant Examiner—Ahmed Elallam
(74) Attorney, Agent, or Firm—Banner & Witcoff, Ltd.

(57) ABSTRACT

This proposal outlines an approach for interfacing Synchronous Transfer Mode (STM) and Asynchronous Transfer Mode (ATM) networks and for transporting voice, fax and voice-band data calls by the ATM network in an efficient manner. In contrast to the well known ATM Variable Bit Rate (VBR) approach, this proposal allows one to transport 64 kb/s traffic efficiently over ATM by re-using STM network signaling and exploiting the standard AAL-1-type adaptation layer (intended for Constant Bite Rate, CBR, services). We use low bit rate encoding algorithms and achieve additional compression for speech by marking cells that do not contain talk spurts. The invention defines specific rules for STM-to-ATM interfacing, including all routing translation, and identifies necessary Terminal Adapter (TA) and ATM switch capabilities. This approach is an advancement over previous inventions that specified network architecture and terminal adapter requirements to provide a graceful transition from an STM network (for example the AT&T long distance network) to an ATM network. Prior art described how to emulate an STM network in the ATM domain, but did not permit for compression and silence elimination and, therefore, did not allow achieving efficiency gains.

19 Claims, 2 Drawing Sheets

TELECOMMUNICATIONS NETWORK ARCHITECTURE FOR TRANSPORTING FAX, VOICE AND DATA VIA AN ATM SWITCH INCLUDING A STM TO ATM TERMINAL ADAPTER

FIELD OF THE INVENTION

The invention relates to the method, architecture and interfaces that allow synchronous transfer mode (STM) traffic to be efficiently transported via an asynchronous transfer mode (ATM) network.

BACKGROUND OF THE INVENTION

In telecommunications systems, the protocol utilized for offering a wide range of high-bandwidth services, e.g., multimedia services, may be based on Asynchronous Transfer Mode (ATM) protocols. These protocols define a particular data structure called a "cell", which is a data packet of a fixed size (e.g., 53 octets, each comprising eight bits).

Typically, ATM standards are based on signaling schemes designed to accommodate multimedia applications. The recent research into advance ATM network architectures has been conducted as illustrated by U.S. Pat. Nos. 5,588,475, 5,483,527, and 5,483,527, entitled An ATM Network Arranged to Interface with STM In-Band Signaling, filed on Dec. 21, 1994, to Doshi et al. Conventional approaches include the use of statistical multiplexing including voice compression in an ATM environment. However, these approaches may require the introduction of Variable Bit Rate (VAR.) capabilities, including sophisticated signaling mechanisms and a different ATM adaptation layer, AAL-2. None of the conventional approaches provide for ATM call set-up using standard signaling systems, traffic management between a terminal adapter and an ATM switch, or variable background noise.

SUMMARY OF THE INVENTION

The invention includes various architectures, structures, and methods for addressing the above mentioned problems. In accordance with aspects of the invention, fax, voice and data calls may be efficiently processed by an Asynchronous Transfer Mode (ATM) switch by re-using a conventional Synchronous Transfer Mode (STM) network signaling system. A standard ATM AAL-1 adaption layer may be utilized to accomplish voice compression. STM-to-ATM call translation may be accomplished by a mapping that is determined based on a Virtual Path/Virtual Circuit occupancy status to take full advantage of available bandwidth by eliminating marked cells.

Our research disclosed in this application has advanced the state of the art by specifying the specific architectures which enable STM to ATM interfaces and which allow a Constant Bit Rate (CBR) call in an ATM domain using existing (i.e., STM in-band or out-of-band) signaling mechanisms to forward a call to its destination. Architectures in accordance with the present invention facilitate the use of ATM technology to carry traditional voice, fax and voice-band data traffic and demonstrate that the evolution to broadband signaling is not necessary in the initial period of STM-to-ATM transition.

Our proposals define network architecture and ATM capabilities required to transport voice efficiently in the ATM domain. It exploits STM network signaling and modifies standard ATM adaptation layer AAL-1 to achieve voice compression. Specifically, to eliminate silence, we augment the cell-building process with appropriate cell marking. In the case of congestion, marked cells that do not contain voice signals are discarded by either the Terminal Adapter or the ATM switch.

We also describe specific rules for STM-to-ATM call routing translation. This mapping may be determined at each instance based on the Virtual Path/Virtual Circuit (VP/VC) occupancy status to take full advantage of the potentially available bandwidth (no marked cells). We also define a method for obtaining and monitoring VP/VC/buffer occupancy data that allows the ATM switch to control bandwidth usage and prevent performance degradation associated with cell loss (a third key idea).

Our proposal results in bandwidth (transport) and switch termination savings and could be applicable in a variety of wide area or local area network settings and in the PABX to ATM environment.

These and other features of the invention will be apparent upon consideration of the following detailed description of preferred embodiments. Although the invention has been defined using the appended claims, these claims are exemplary in that the invention is intended to include the elements and steps described herein in any combination or subcombination. Accordingly, there are any number of alternative combinations for defining the invention, which incorporate one or more elements from the specification, including the description, claims, and drawings, in various combinations or subcombinations. It will be apparent to those skilled in network theory and design, in light of the present specification, that alternate combinations of aspects of the invention, either alone or in combination with one or more elements or steps defined herein, may be utilized as modifications or alterations of the invention or as part of the invention. It is intended that the written description of the invention contained herein covers all such modifications and alterations.

BRIEF DESCRIPTION OF THE DRAWINGS

The foregoing summary of the invention, as well as the following detailed description of preferred embodiments, is better understood when read in conjunction with the accompanying drawings. For the purpose of illustration, embodiments showing one or more aspects of the invention are shown in the drawings. These exemplary embodiments, however, are not intended to limit the invention solely thereto.

DETAILED DESCRIPTION

Figure 1:
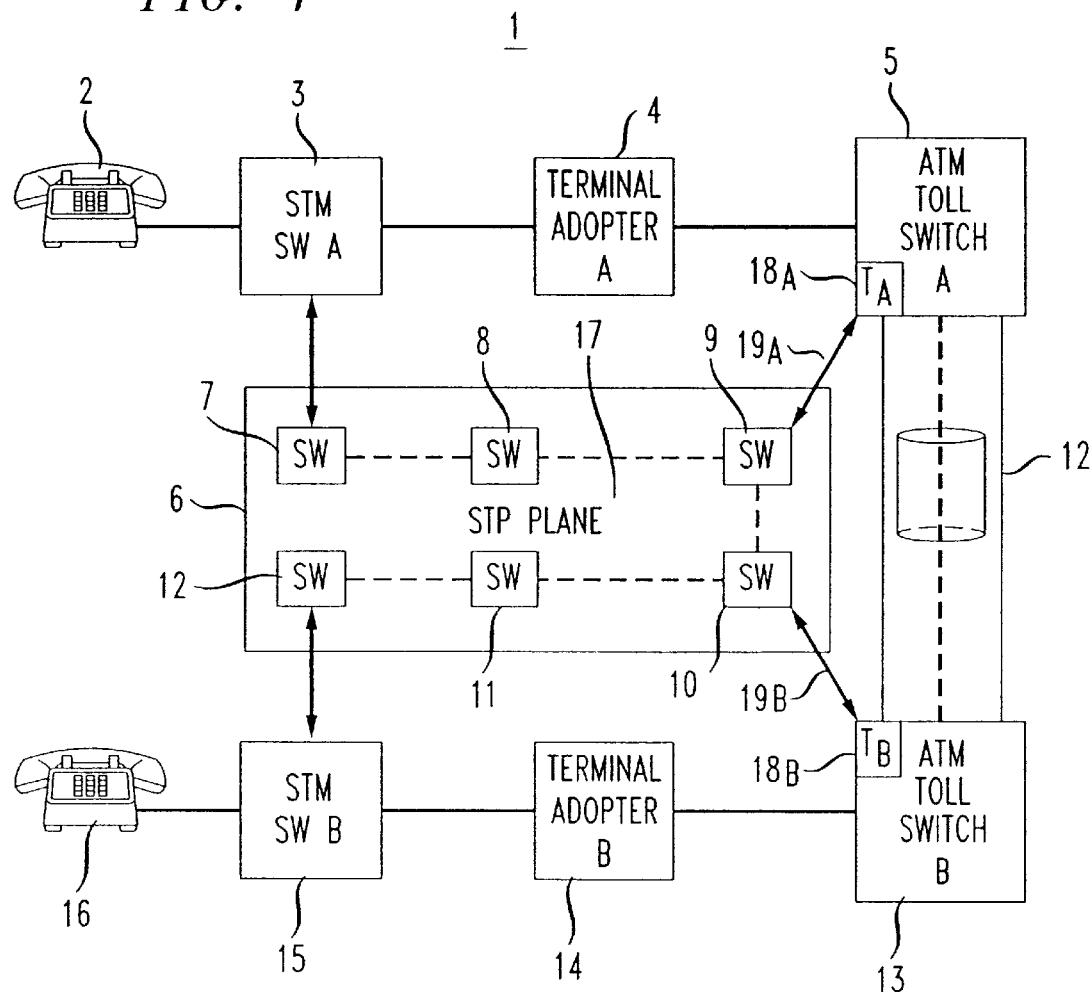
FIG. 1 illustrates an overall architecture of an embodiment incorporating one or more aspects of the present invention.

FIG. 1 illustrates an one embodiment of the invention where the processing of voice over an ATM network is achieved utilizing a conventional call set-up/routing processes. Additionally, aspects of the architecture may be utilized to achieve compression efficiencies. Referring to the exemplary embodiment of the switching network 1, a first telephone 2 may be interconnected via a synchronous transfer mode (STM) switch 3 to a terminal adaptor (TA) 4 and a signal transfer point plane 17. The terminal adaptor 4 may be utilized to couple analog voice calls from the phone 2 to the ATM switch A 5. Data may thereafter be transported across the ATM network 12 via conventional mechanisms to ATM switch B 13 for transmission to Terminal adaptor B 14. In exemplary embodiments, the ATM toll switches A, B represent originating and terminating nodes for the AT&T long distance (wide area) network such as those switches located at two local offices.

A similar network configuration may be initiated by utilizing a LAN in place of the ATM toll switches A, B. In the LAN configuration, toll switches A, B, are replaced with a LAN, or frame relay router.

Out-of-band Signaling

For the purposes of example, the embodiment illustrated in FIG. 1 has telephone 2 located at a distance from telephone 16, and thus calls originating from telephone 2 arrive at a central office located at a distance from telephone 16. In the STM type call set-up process (SS7 out of band signaling), it is desirable to configure the ATM switches A, B, to include translators T configured for translating STM call set-up instructions into instructions understood by an ATM Fabric controller (not shown) located in each ATM switch A, B. The translators T may be variously configured, but most preferably translate the STM call set-up instructions into commands which define a new Virtual Path/Virtual Circuit connection path across ATM network 12 to carry the data of the telephone call.

Where the call has been initiated, STM switch 9 may alert an associated ATM switch (e.g., ATM switch A 5), that a call has been initiated by sending a call set-up message via a signaling path on STP Plane 17 through the translator T to the ATM switch A 5. The ATM switch A 5 then defines a virtual circuit/virtual path to the destination ATM switch B 13 for transport of data associated with the call. The virtual circuit/virtual path may be established using any suitable routing strategy (for example (Real Time Network Routing (RTNR) in the case of AT&T) where the originating toll switch identifies a logical path and/or logical circuit (single link or two-link in the case of RTNR) for the call to reach the terminating ATM toll switch (e.g., ATM switch B 13). The data is then sent from phone 2, through STM switch A 3, through terminal adaptor A 4, through ATM switch A 5, through the ATM switching network 12, through ATM toll switch B, through terminal adaptor B 14, through STM switch B 15 and to phone 16.

In the forgoing configuration, when a call is initiated, a call set-up message is sent across the STP plane 17 to initiate the call with telephone 16. In this embodiment, the call set-up information may be processed using conventional SS7 call set-up signaling techniques across the STP plane 17. Since the call set-up techniques of SS7 are conventional, these techniques are not described in detail herein. The call set-up is progressed through a plurality of interconnected STM Switches (e.g., STM Switches 7–12). Thereafter, data is transmitted via the ATM switching network.

In-band Signaling

In the second exemplary embodiment, the configuration shown in FIG. 1 may operate using in-band signaling. In actuality, in-band signaling may be more correctly described as a hybrid system using aspects of SS7 signaling and aspects of in-band ATM signaling. The overall architecture for this hybrid system may be described below.

A call set-up message (referred to as an Initial Address Message, IAM) may be configured to contain:
  a) the destination number,
  b) the Automatic Number Identification, ANI, of the calling station, and
  c) the identities of the trunk sub-group and trunk that will be used to send the call to the toll switch.

The IAM message may be sent via the STP plane to the ATM switch A. Thereafter, the ATM switch A may forward the IAM messages across the ATM switching network 12. The call processor of the ATM Switch A may store the IAM message and use the destination number to identify the terminating toll switch, i.e., ATM switch B 13 in this example). Then, based on the routing strategy (for example (Real Time Network Routing (RTNR) in the case of AT&T), the originating toll switch identifies a logical path (single link or two-link in the case of RTNR) for the call to reach the terminating ATM toll switch (e.g., ATM switch B 13). This routing mechanism may use a trunk hunting algorithm to identify a particular trunk that will carry the toll call. The IAM message, which may include trunk and trunk subgroup information, may then be sent to the terminating ATM toll switch (ATM switch B 13) via a signaling path across the ATM network. The terminating toll switch (ATM Switch B 13) may then send the LAM message to STM SW B 15, and may also include specific trunk information as well as the call destination number in the transfer. The transfer of the signaling information may occur via translator B 18B, across path 19B, through STM switches 10, 11, and 12 in the STP Plane 17 to STM switch B 15.

Local STM switch B 15 may thereafter verify that the destination telephone is idle. If it is, local STM switch B may supply a ringing voltage to the telephone line, change the incoming/outgoing trunk status to busy, and then return a call complete message to the terminating toll switch ATM Switch B 13. ATM Switch B 13 may then be configured to change the status of incoming/outgoing trunks and passe the call complete message to the originating toll switch ATM Switch A 5. Similarly, the originating toll switch (ATM Switch A) may be configured to change the status of trunks that were identified to establish the connection through the switching fabric and passe the call complete message to the STM switch A 3. Now, STM SW A 3 is ready to establish the call, e.g., through the ATM switching network 12.

Conventionally, ATM switches A and B, are incapable of understanding IAM messages and other call set-up information. In order for ATM Switches A and B to be configured to carry compressed (sub-64 kb/s) voice and fax calls in the above embodiments, certain modifications need to be made. As described in more detail below, the ATM switches in accordance with aspects of the present invention may be modified to have certain capabilities (e.g., located in the terminal adaptors A 4 or B 14) to enable set-up of the connection in accordance with the network architecture illustrated on FIG. 1. The call set-up procedures may be designed to enable the voice and fax calls to be carried at 64 kb/s and/or various sub-rates.

Terminal Adapter

Figure 2:
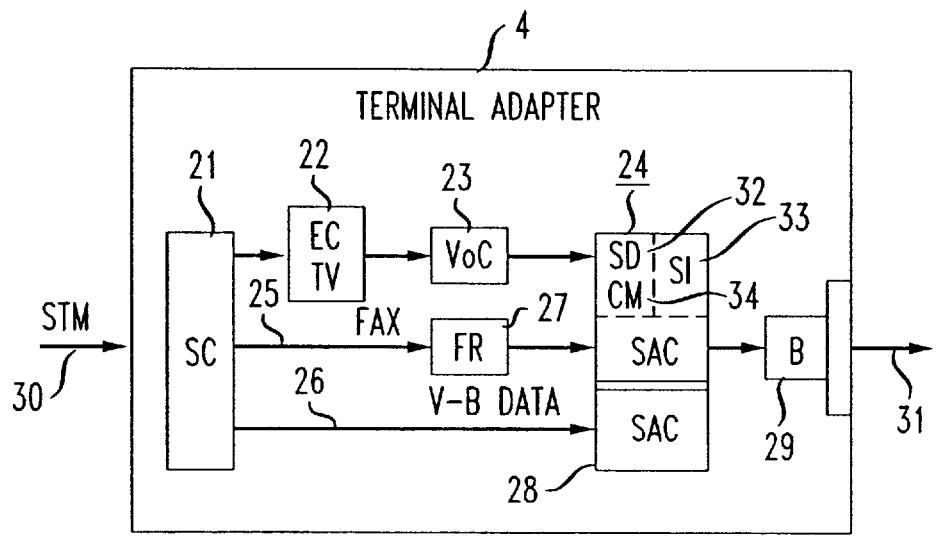
FIG. 2 shows details of the terminal adapter of FIG. 1.

Referring to FIG. 2, the terminal adapter A 4 or B 14 may be variously configured. In one embodiment, the terminal adapter receives the STM signal 30 from the STM switch A 3. A signal classifier 21 is included in order to be able to apply an optimized compression algorithms. For example, the signal classifier (SC 21 may be configured to identify voice, fax and voice-band calls. As shown in FIG. 2, it may be desirable to include separate Echo Control (EC) and True Voice (TV) functionality within the terminal adapter 4 after the signal classifier. The echo control/true voice module 22 may be provided either inside or outside of the TA 4. For example, the echo control/true voice quality enhancements may be done in the STM domain. Thereafter, low-bit rate encoding techniques may be employed in the terminal adapter such as voice compression (VoC) 23 and/or Fax Re-modulation (FR) 27. These algorithms could provide bandwidth advantage by a factor of 4 or above with minimum perceptible quality degradation.

The compressed voice/fax signal (e.g., a 16 kb/s data stream) may be used to produce ATM cells using, for example a STM-to-ATM converter (SAC) 24. The STM-to-ATM converter (SAC) 24 may be variously configured. In one exemplary embodiment, the SAC 24 may operate in a CBR mode and using standard ATM Adaptation Layer (AAL-1) for STM-to-ATM conversation function. In this example, voice calls produce cells at a constant rate either during a speaking spurt or during silence periods. The payload may be variously configured but n exemplary embodiments is 47 bytes.

In further embodiments, a silence detection module 32 may be included in the terminal adapter. The silence detection module 32 may be configured to determine a level of speech activity for each cell. The silence detection module 32 may include a marking module 34 which may be configured to mark cells with an indication of a level of speech activity occurring in data stored in a particular cell. The level of speech activity marked in a particular cell may be any number of levels. In the most rudimentary embodiment, the level of speach activity may contain only two levels and mark speech that represents silence only and those cells that contain even partial voice spurts. Where only two levels are utilized, cells can be marked using the standard Cell Loss Priority (CLP) bit, for example. Where three or more levels of voice activity are utilized (e.g., silence, partial voice spurts, speech), it may be desirable to mark each of these levels using two or more defined bits. With three or more levels of voice activity are utilized, the silence cells representing periods of silence would be dropped first, the intermediate cells representing periods of partial voice spurts would be dropped second, and the speech cells would be maintained in-tact if possible. Where intermediate cells and/or silence cells are dropped, it may be desirable to replace these cells by replicating the one of the last silence cell received.

The silence detection module 32 may be variously utilized to either discard silence cells and/or to conditionally discard silence cells as necessary. In one exemplary embodiment, all marked and unmarked cells may be output to the terminal adapter output buffer 29. At any time after the marking of the cells, marked cells may be dropped if there is congestion. However, where there is sufficient bandwidth, which is most of the time for well-designed networks, there is no need to discard marked cells and hence the over fidelity of the voice call is substantially improved without the need to substitute comfort noise in the background. Thus, there is no need to model the silence/background noise under normal conditions and, most importantly, performance degradation due to silence elimination is avoided. Additionally, where cells are dropped, it may be desirable to simply repeat the last silence period cell in place of the dropped cell. This system may be particularly effective where the ATM switches have a rule based mechanism which limits the number of silence period cells which may be dropped to around 66.6% of the overall cells. This percentage may of course vary between different ranges such as 50–85% of the cells depending on the network topology and the desired background noise fidelity.

In exemplary embodiments, a number of cells processed by the terminal adapter 4 may be stored in the output buffer 29. Accordingly, there may be times when the queue in the output buffer 29 approaches an overflow condition. The probability of a buffer overflow may be increased where the terminal adapter 4 is configured to have several channelized calls (DS3s) as inputs to TA and only a single DS3 carrying cells as output. In these embodiments, there is an increased probability of a queue overflow in the output buffer 29.

Where the cells are marked, a queue overflow in output buffer 29 may be addressed by discarding marked cells in the case of an impending buffer overflow. Cell dropping for marked cells may occur at the originating terminal adapter, in the ATM switching network 12 (including ATM switch A and/or B), or at the destination TA 14. At a subsequent ATM network element, all dropping is complemented by Cell Insertion (CI) at the destination terminal adapter 14. Since the cell inter-arrival relationship on a VC is retained and the cells are numbered, the destination terminal adapter 14 may utilize a silence insertion (SI) module 33 to identify how many cells are missing and where the missing silence cells may be re-inserted. Thereafter, the silence insertion module 33 may insert cells using any suitable algorithm. For example, inserted cells may be formed as copies of other marked cells for this connection (VC), or may be formed from a model for background noise for the particular call in progress.

STM-to-ATM Translation

In existing AT&T long distance networks, all voice, fax and voice-band data calls require a 64 kb/s channel. In embodiments of the architecture disclosed in the present invention, it may be desirable to establish one Virtual Circuit (VC) per call which may have either a variable and/or fixed bandwidth. For example, bandwidth of the virtual circuit may depend on the type of call being initiated as, for example, detected at the signal classifier 21 with different bandwidths utilized for different type of calls.

Although there is no bandwidth equivalency between trunks and trunk sub-groups on the STM side and Virtual Paths (VP) and VCs on the ATM side, it may be desirable to establish a one-to-one correspondence between the two paradigms. For example, each trunk sub-group I may be mapped into a unique VP, and each trunk j from sub-group i may be mapped into a unique VC. This mapping has significant advantages in maintenance and support. In these embodiments, the mapping may assign the first trunk to the first virtual circuit provided the number of virtual paths are sufficient to guarantee that there are as many simultaneous virtual connections (VCs) as the corresponding trunk sub-group.

In certain ATM networks with many terminal adapters 4, there may be lack of bandwidth on the terminal adapter to ATM switch link. In these networks, it may be desirable to configure the bandwidth of these links to carry an expected call type mix of voice, fax, and data type calls. In unusual circumstances where there are many uncompressed voice-band data calls, the ATM switch may block certain calls where the actual bandwidth usage on a particular virtual path is in danger of being exhausted.

In exemplary embodiments, the ATM switch may be better able to deal with congestion situations where the ATM switch is supplied with information about the call type from the signal classifier 21 for each of the active VCs. This information may be communicated to the ATM switch using any suitable mechanism such as by dedicating a special VC for this purpose. For example, the payload of the cells of this VC could be partitioned in fixed fields and populated with the requisite information. For instance, it could be partitioned into 16 consecutive 3-octet fields. Each of the first 15 fields consists of a 2-octet VCI value with the remaining octet used to indicate its busy/idle status and indicating call type (voice, fax or voice-band data). The first octet of the last field may indicate the traffic condition of the virtual path (e.g., the status of the buffer feeding the virtual path). The remaining 2 octets may be used for error control by providing a cell sequence number and a CRC.

This traffic management type of data may be used by the ATM switch to assess whether or not there is sufficient bandwidth on a particular VP to accept one more call. To avoid service degradation (loss of unmarked cells) it is always assumed that the next call will require maximum, 64 kb/s, bandwidth.

ATM Switch

Figure 3:
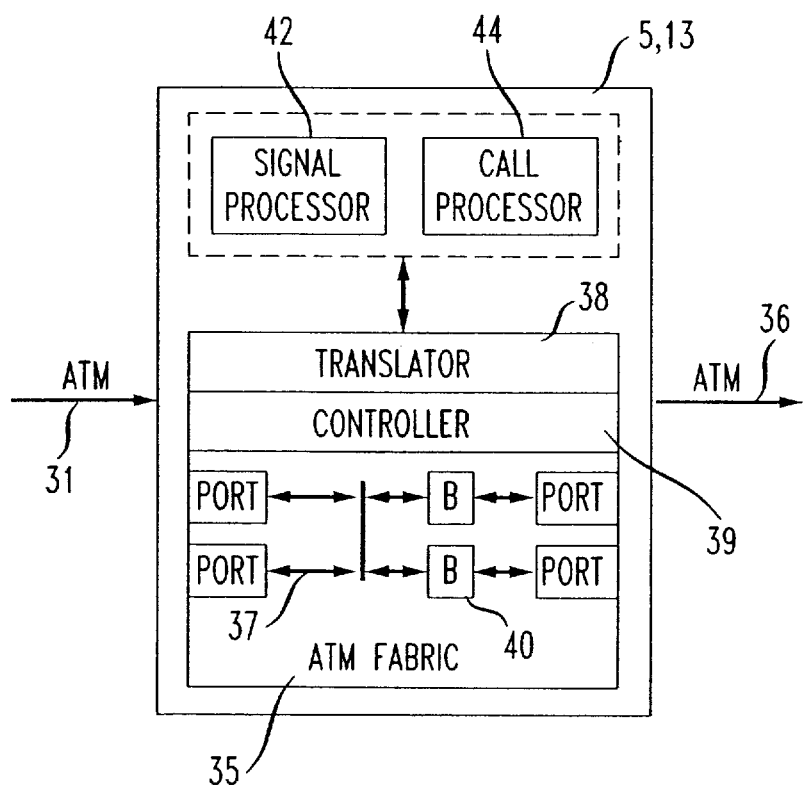
FIGS. 3 shows details of an ATM switch in for use in the architecture of FIG. 1.

Referring to FIG. 3, an ATM switch 5, 13 in accordance with one or more aspects of the present invention may include an STM signal processor 33, an STM call processor 34, and a various ATM fabric functionality 35 including an STM-to-ATM Translator 38, ATM Fabric Controller 39, an output buffer 40 for discarding marked cells in the case of anticipated overflow and/or various ATM routing functions 37. The call processor may be utilized to process call set-up information as discussed above for in-band signaling, and the signal processor may be utilized as the conventional signal processor in the ATM switch. The translator translates trunk groups/subgroups into virtual paths/virtual circuits in the ATM domain with the assistance of controller 39. The cells are routed in conjunction with ATM routing circuits 37. Where cells begin to overflow, the cells in one or more of the buffers may be purged in accordance with the marking above. Where three levels of marking are used, the silence cells are purged before cells with partial silence.

In operation, it may be desirable to assign the ATM fabric ports to establish various connections in accordance with the STM instructions received as described above. With respect to the incoming ATM signal from the terminal adapter 4, as described above, it may be desirable to utilize the STM-ATM translator 38 to provide a permanent trunk group/subgroup to VP/VC one-to-one mapping stored in the ATM switch 5, 13. Where this mapping is utilized, it may be desirable to define VPI, VCI assignment at the output port.

Considering the fact that in the ATM domain VPI, VCI numbers have only local significance, it may be desirable to establish a sub-group VP mapping as defined below. We can enumerate all trunk sub-groups in the toll network using Network Switch Numbers (NSN) in a unique fashion. For example, starting with NSN 1, we list all sub-groups to NSN 2:(1, 2, 1; . . . ; 1, 2, $m_{1-2}$), etc., and ending with trunk sub-groups from NSN (N−1), to NSN N. With this mapping sub-group (i, j, k) corresponds to virtual path k between switches i and j. This virtual path is identified at switches i and j by the respective VPI values f(i,k) and f(j,k). Note that if there is no ATM layer processing (multiplexing, cross connecting or switching) at the virtual path level between switches i and j, the f(i,k)=f(j,k).

Now, for a given virtual path we can describe how to establish trunk/VC mapping. We can assume that the maximum number of connections that this virtual path can support is equal to M. M corresponds to the case when all VCs require minimum bandwidth. As an example, the least amount of bandwidth could be required by VCs carrying speech (assuming compression and silence elimination). The VP occupancy status may be illustrated by the following table:

TABLE 1

| VP Status Data | | | |
|---|---|---|---|
| Virtual Channel Id | Busy/Idle Status | Call type | Usable or Not |
| 1 | busy | Voice | — |
| 2 | idle | — | usable |
| M | idle | — | not |

In exemplary embodiments, the call type status in Table 1 for active VCs may be provided to the ATM switch controller 36 via the STM—ATM translator 38 as discussed above using, for example, the dedicated special VC for this purpose. The last column indicates that not all idle VCs could be available for use. The discussion below explains this situation and proposes how to monitor and update these data.

In the STM domain, each 64 kb/s trunk carries a single connection. In accordance with our proposal, each connection corresponds to a particular virtual circuit. Depending on the call type, these connections may require a different ATM bandwidth. In spite of bandwidth differences, it may be desirable to establish a one-to-one relationship between assumed M trunks for this sub-group and M potential virtual circuits. To reflect actual bandwidth usage on the virtual path, it may be desirable to utilize a ATM fabric controller 39 to conservatively estimates bandwidth requirements depending on the call type. (The word conservatively refers to silence elimination for voice, which is statistical in nature.)

Assuming, for example, that 8 kb/s is sufficient to carry a voice call. Then, with the arrival of a voice-band data call (no compression), we update our VP occupancy table, specifying that one more VC is busy carrying a voice-band data call, and designating seven additional idle/usable VCs with idle/non-usable status. The seven additional idle/usable VC represent the unused VC bandwidth which is not utilized by the voice call i.e., the number of remaining (idle/usable) VCs corresponds to the number of additional voice connections that the virtual path can carry. Thus, the idle capacity has similar and consistent interpretation in both ATM and STM domains, allowing the use of STM RTNR strategy for call routing. In this configuration, it is possible for the ATM switch to accept one more call to a particular virtual path if the remaining bandwidth is at least 64 kb/s.

While exemplary systems and methods embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments. Additionally, although a terminal adapter is shown being connected to an analog phone, the inventions defined by the appended claims is not necessarily so limited. For example, the terminal adapter may be disposed in a PABX of a business. Furthermore, examples of steps that may be performed in the implementation of various aspects of the invention are described in conjunction with the example of a physical embodiment as illustrated in FIG. 1. However, steps in implementing the method of the invention are not limited thereto. Additionally, although the examples have been derived using the ATM protocol, it will be apparent to those skilled in the art that any cell based protocol may also be used.

What is claimed is:

1. A method comprising:

disposing a terminal adapter between a STM switch and a ATM switching network;

utilizing the terminal adapter to map trunks and trunk subgroups from the STM switch into virtual paths/virtual circuits in the ATM switching network;

utilizing the terminal adapter to classify an incoming signal as one of voice, fax and data; and utilizing a terminal adapter to mark, responsive to the signal classification as voice, one or more silence cells and to repeat one or more silence cells in response to a cell missing from a virtual circuit, wherein during marking, said terminal adapter further marks cells containing partial silence and partial speech and cells substantially containing speech.

2. A method as recited in claim 1 further comprising the steps of dropping silence cells first, partial speech cells second and maintaining substantially speech cells intact.

3. The method of claim 1 wherein the terminal adapter communicates traffic management data with the ATM switching network using a dedicated virtual circuit.

4. The method of claim 1, further comprising a step of utilizing the terminal adapter to compress the incoming signal using a compression algorithm optimized for the class of the incoming signal.

5. A method as recited in claim 1 further comprising the step of dedicating a virtual circuit for traffic management data.

6. A method comprising:

disposing a terminal adapter between a STM switch and a ATM switching network;

utilizing the terminal adapter to map trunks and trunk subgroups from the STM switch into virtual paths/virtual circuits in the ATM switching network;

utilizing the terminal adapter to classify an incoming signal as one of voice, fax and data;

utilizing a terminal adapter to mark, responsive to the signal classification as voice, one or more silence cells and to repeat one or more silence cells in response to a cell missing from a virtual circuit; and determining bandwidth availability and dropping marked cells if there is congestion.

7. The method of claim 6 wherein the terminal adapter communicates traffic management data with the ATM switching network using a dedicated virtual circuit.

8. The method of claim 6, further comprising a step of utilizing the terminal adapter to compress the incoming signal using a compression algorithm optimized for the class of the incoming signal.

9. A method as recited in claim 6 further comprising the step of dedicating a virtual circuit for traffic management data.

10. A telecommunications network including a STM switch, a ATM switching network, and a terminal adapter disposed there between, the terminal adapter being configured to (1) map trunks and trunk subgroups from the STM switch into virtual paths/virtual circuits in the ATM switching network; and (2) classify a type of incoming signal as one of voice, fax and data; and the terminal adapter including a silence detection module that, responsive to a classification as voice, marks one or more silence cells and a silence insertion module that repeats one or more silence cells in response to a silence cell missing from a virtual circuit, wherein said silence detection module further marks cells containing partial silence and partial speech and cells substantially containing speech.

11. A telecommunications network as recited in claim 10 wherein said silence detection module drops silence cells first, partial silence cells second and maintains substantially speech cells intact.

12. The telecommunications network of claim 10 wherein the terminal adapter communicates with the ATM switching network using a virtual circuit.

13. The telecommunications network of claim 10, wherein the terminal adapter is further configured to compress the incoming signal using a compression algorithm optimized for the class of the incoming signal.

14. A telecommunications network as recited in claim 10, the ATM switching network dedicating a virtual circuit for traffic management data.

15. A telecommunications network including a STM switch, a ATM switching network, and a terminal adapter disposed there between, the terminal adapter being configured to (1) map trunks and trunk subgroups from the STM switch into virtual paths/virtual circuits in the ATM switching network; and (2) classify a type of incoming signal as one of voice, fax and data; and the terminal adapter including a silence detection module that, responsive to a classification as voice, marks one or more silence cells and a silence insertion module that repeats one or more silence cells in response to a silence cell missing from a virtual circuit, the terminal adapter further for determining bandwidth availability and the silence detection module dropping marked cells if there is congestion.

16. The telecommunications network of claim 15 wherein the terminal adapter communicates with the ATM switching network using a virtual circuit.

17. The telecommunications network of claim 15, wherein the terminal adapter is further configured to compress the incoming signal using a compression algorithm optimized for the class of the incoming signal.

18. A telecommunications network as recited in claim 15, the ATM switching network dedicating a virtual circuit for traffic management data.

19. A telecommunications network including:

a STM switch;

a ATM switching network;

a terminal adapter disposed between the STM switch and the ATM switching network; and an ATM switch configured to indicate to the terminal adapter a busy status whenever the available bandwidth is less than 64 kbps, the ATM switch being further configured to dedicate a virtual circuit for traffic management data including busy/idle status, signal classification or buffer status data, wherein the terminal adapter is configured to map trunks and trunk subgroups from the STM switch into virtual paths/virtual circuits in the ATM switching network, and further comprises a signal buffer, a signal classifier for classifying signals, and a silence detection module for detecting and marking cells as comprising one of silence, partial silence and partial speech and substantially speech responsive to a classification as voice.

* * * * *

UNITED STATES PATENT AND TRADEMARK OFFICE
CERTIFICATE OF CORRECTION

PATENT NO. : 6,324,174 B2
DATED : November 27, 2001
INVENTOR(S) : Behram H. Bharucha et al.

It is certified that error appears in the above-identified patent and that said Letters Patent is hereby corrected as shown below:

<u>Title page,</u>
Item [56], References Cited, U.S. PATENT DOCUMENTS, Reference 19, "6,061,504" has been replaced with -- 6,081,504 --.

Signed and Sealed this

Seventeenth Day of September, 2002

Attest:

JAMES E. ROGAN
Attesting Officer *Director of the United States Patent and Trademark Office*